Figure 1:
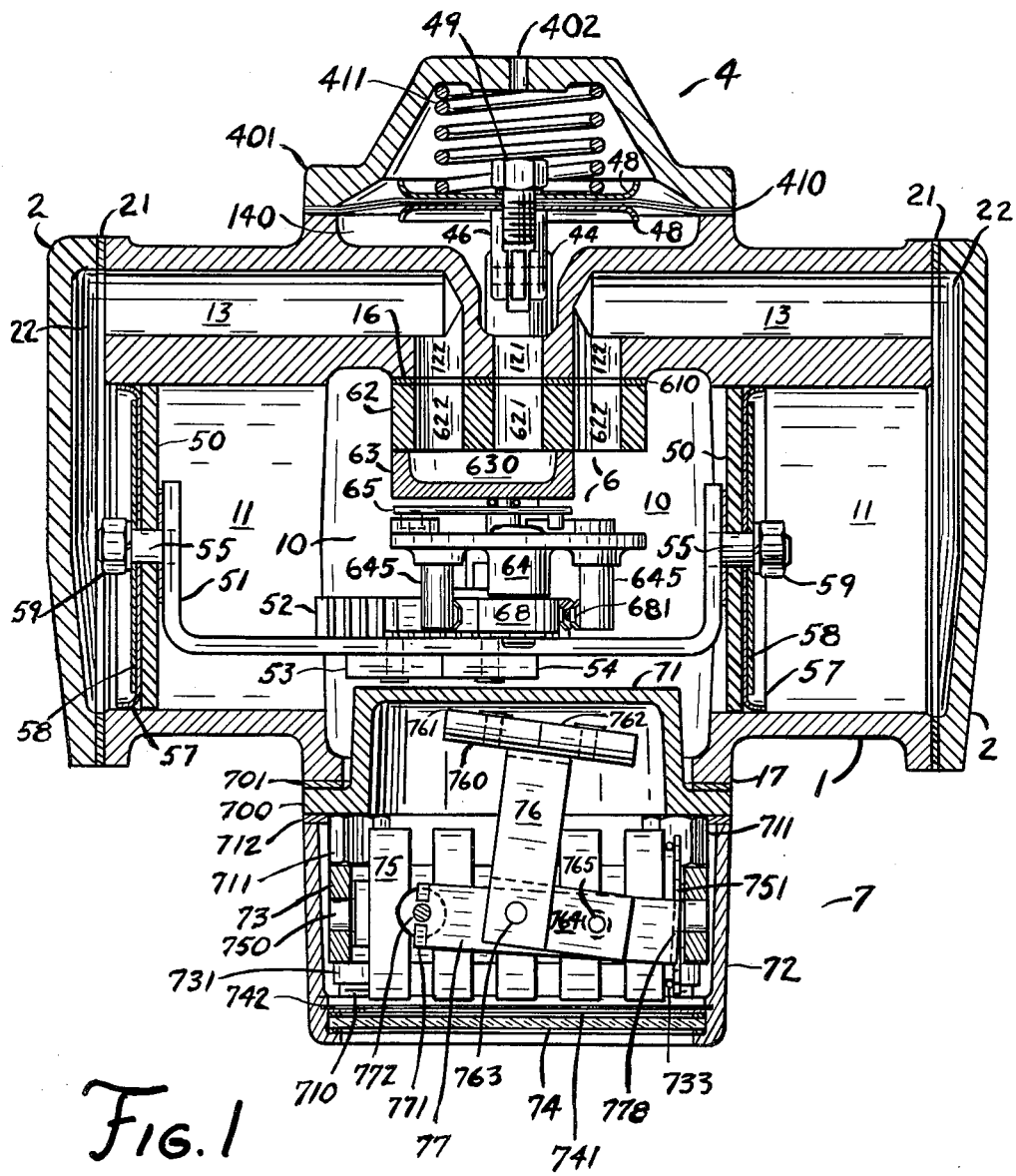

April 25, 1961  R. E. NELSON ET AL  2,981,240
FLUID FLOW METERS
Filed Jan. 29, 1960  4 Sheets-Sheet 3

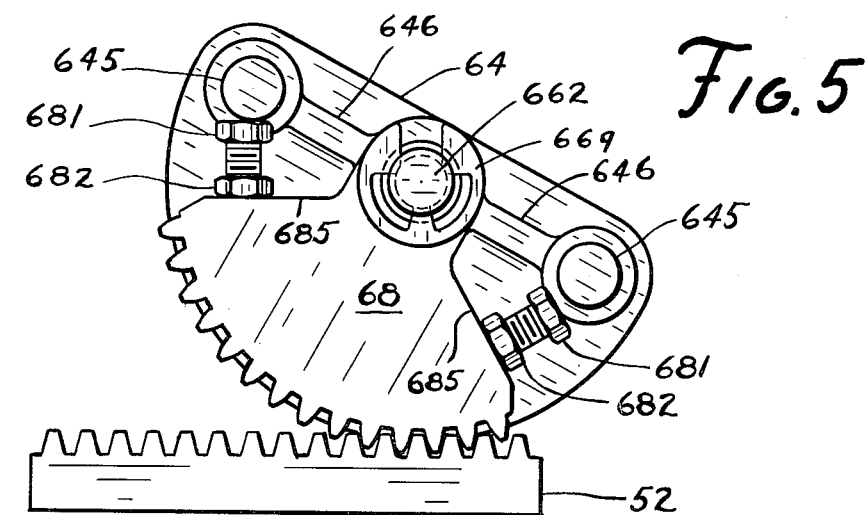
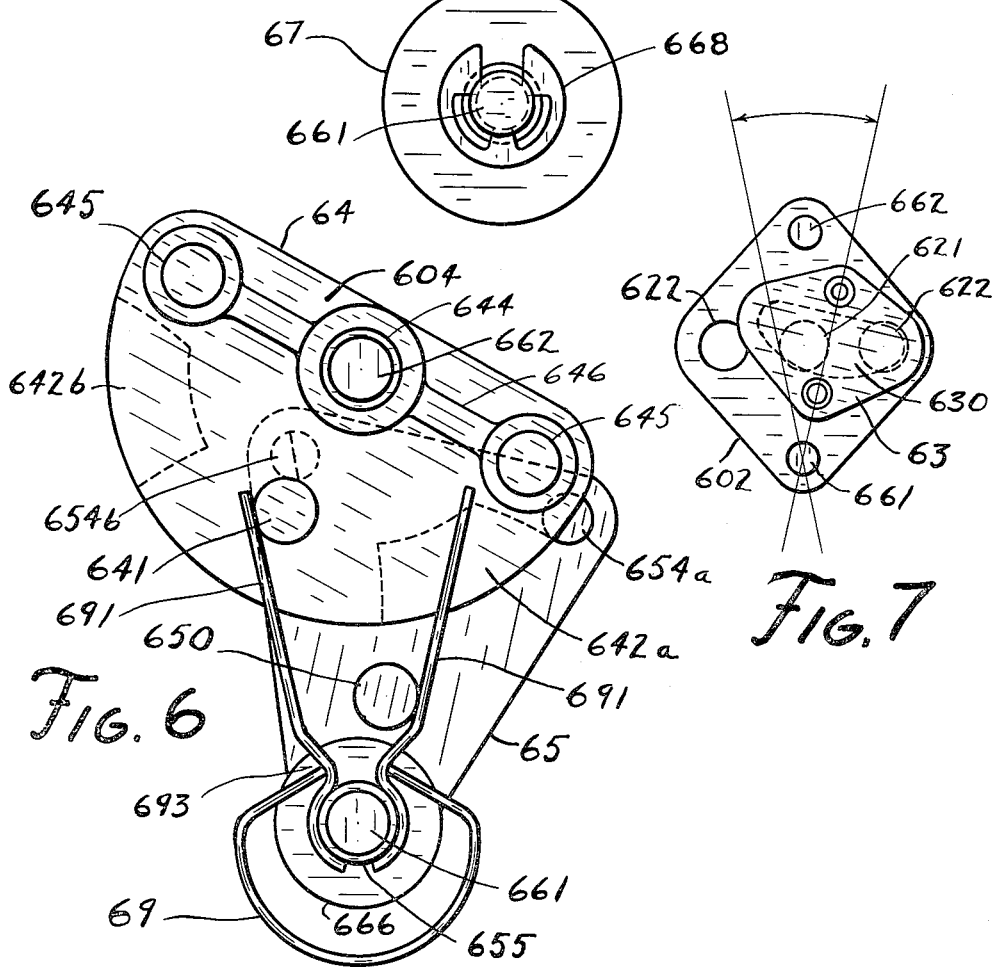

United States Patent Office 2,981,240
Patented Apr. 25, 1961

2,981,240

FLUID FLOW METERS

Robert E. Nelson, Willow Springs, Rosamond, Calif., and George E. Tench, South Pasadena, Calif.; said Tench assignor to said Nelson Filed Jan. 29, 1960, Ser. No. 5,408

7 Claims. (Cl. 121—164)

This invention relates to the measurement of the flow of fluid, and particularly at low rates of delivery. The meter of our invention is of the positive displacement type, employing sealing means of a high order to avoid leakage or unrecorded flow which would otherwise impair the ability of the meter to record accurately very small deliveries.

One of the objects of this invention is the provision of trip cycling valve means of reliable and rugged construction, capable of being installed in the meter as a pre-assembled unit, and driven from the displacement or measuring means in a manner which provides ease of adjustment of the meter for calibration, continued accuracy in sustained operation, and freedom from excessive friction or binding, even when the interconnecting drive parts are installed under considerable misalignment.

In prior art it has been usual to apply the incoming fluid pressure to the valve elements in a direction to increase valve seating force as pressure drop through the meter increases. It is an object of our invention to avoid the possibility of impairment of valve action which may be present with this construction by carrying the incoming fluid pressure to the valve in such direction as to reduce seating force with increasing pressure drop, thus making the valve action potentially self-clearing.

For some applications of our meter it is our object to calibrate the seating force of the valve elements to permit the valve to by-pass the measuring displacement elements of the meter whenever a predetermined pressure drop is exceeded. This action insures continued delivery of fluid, not only in the event of malfunction of the meter but also whenever the demand for delivery exceeds the capacity of the meter delivering normally. An example is the employment of our meter with lubrication systems wherein continued supply of lubricant is of greater importance than measurement of the amount delivered.

For applications of the meter which require that delivery be under controlled pressure, it is our object to make provision for optionally including within the meter body a pressure regulator, combining the regulator in a simple manner which allows the use of the regulator chamber for access to our means for securing the valve assembly and also gives a short, direct passage from the regulator to the valve.

A further object is to employ the regulator optionally to insure complete metering of the fluid passing the meter. This we accomplish by calibrating the regulator to a delivery pressure below that required to by-pass the valve. Regulator reference pressure may be atmospheric or that of some part of the delivery system, brought to the regulator in a conventional manner.

In order to transmit motion from the moving elements of the meter to a registering means out of contact with the fluid being metered, it is common to use a magnetic drive acting through a non-magnetic wall between the metering elements and the registering means. An important object of this invention is the provision of magnetic driving means for this purpose which are capable of giving an accurately initiated, strong snap-action to the driven element, without requiring any separate snap means to initiate action from the driving side. We accomplish this result by employing two permanently magnetized elements, one driving and one driven, placed in magnetic opposition to give an over-center force characteristic. Another object of this invention which this magnetic drive also satisfies is the subjection of the driving element, which we carry preferably directly upon the piston and connecting rod assembly, to a reversing force component in the direction of piston travel. This force reversal not only partially compensates for the normal tendency of the trip valve loading means to increase the loading on the piston assembly as each stroke progresses, but also, by reducing the net operating pressure required at the end of each stroke, tends to reduce the calibration error of the meter associated with pressure variations occurring at the time of valving.

Another object associated with the foregoing is the employment of the magnetic drive through improved actuating means to operate a mechanical counter assembly capable of being read in a direction parallel to the axis of the opposing meter cylinders. This relative positioning facilitates the placing of the meter with cylinder axis horizontal, a desirable position functionally Although the mechanical counter of our invention is a preferred form of registry, it will be apparent that the magnetic drive which we have provided is also capable of actuating various types of conventional registering means, whether mechanical or electrical, the use of which may be required in particular applications of the meter.

Figure 2:
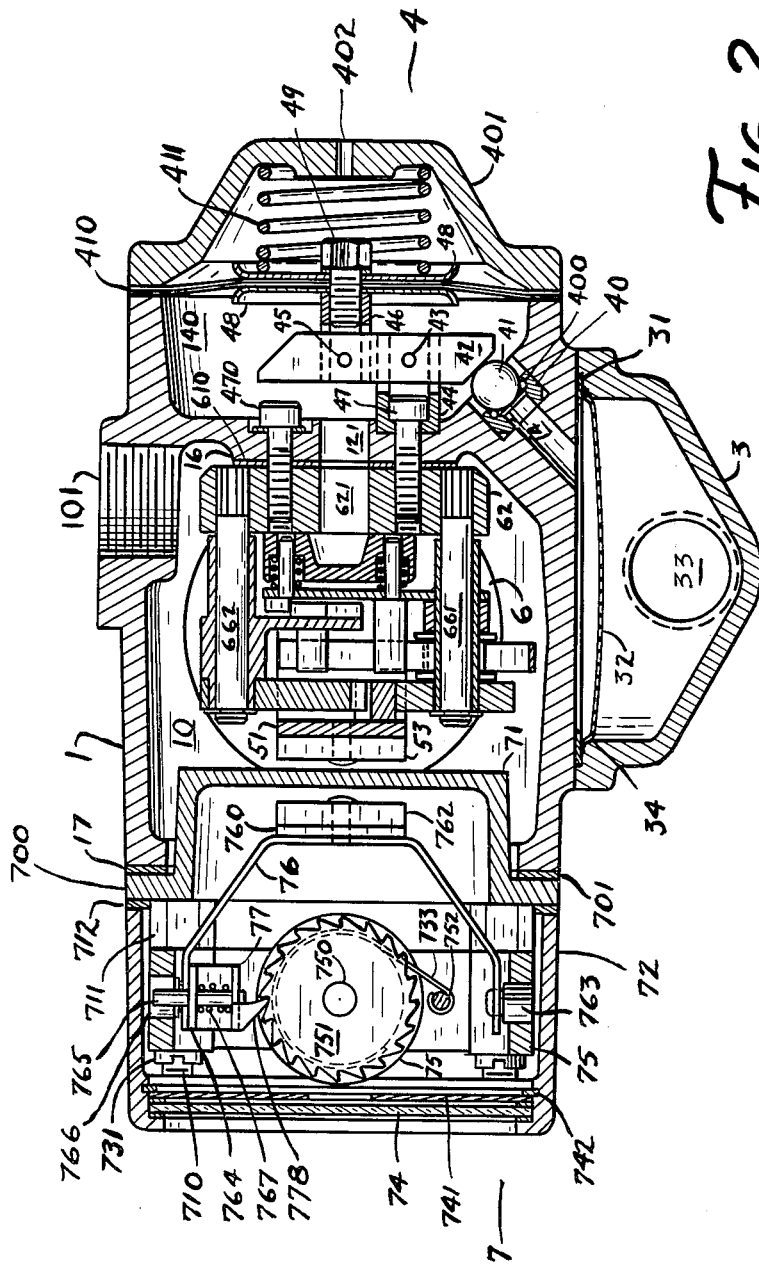
Figure 3:
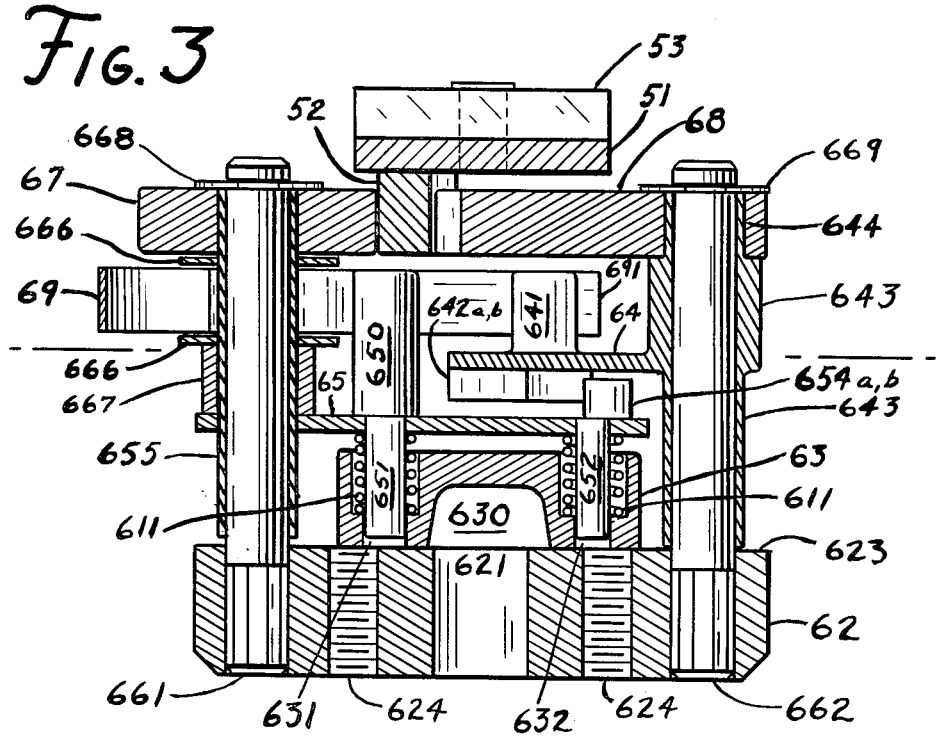
Figure 4:
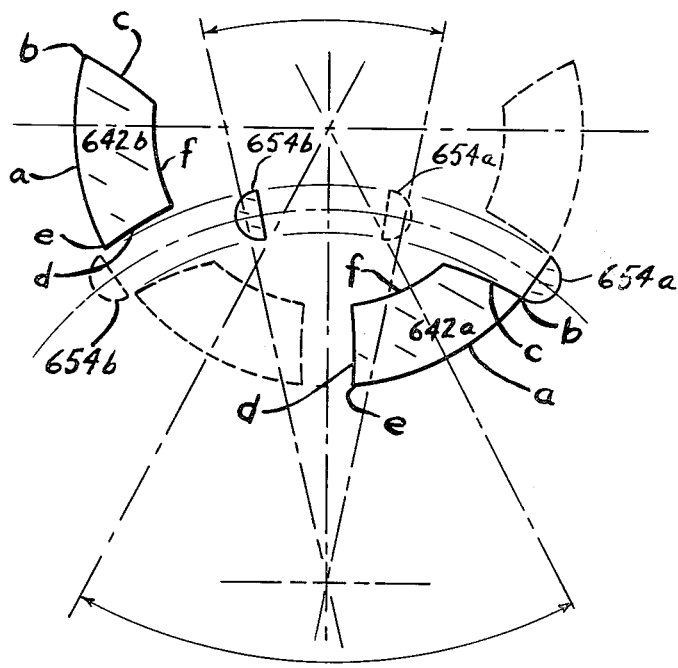

In the drawings, Figure 1 is a general section through the meter, taken horizontally through the axis of the cylinders. Figure 2 is a vertical section through the central chamber perpendicular to the cylinder axis. Figure 3 is a section through the valve assembly and piston rod on the plane of Figure 2, but with the view rotated to place the valve base at the bottom and to a larger scale. Figure 4 is a diagram showing the geometry of the valve escapement. Figure 5 is a frontal or end-on view of the valve gear sector, primary or independent escapement arm, piston rod and rack, and piston rod support roller. Figure 6 shows the secondary or dependent escapement arm with the loading C-spring and loading clips. Figure 7 shows the valve base and valve plate in diagram to show the porting.

The meter is built around a main body casting 1 having a central chamber 10 between laterally opposed cylinders 11. These cylinders are closed at their outer ends by the heads 2 with gaskets 21. The trip or cycling valve 6 mounts within the central chamber 10 against the pad 16 in the rear of the chamber, using gasket 610. Passages 13 in the body 1 communicate with the cylinder ends through the head spaces 22, and with the valve through the short connecting passages 122. The opposed pistons 50 are joined by the rigid connecting rod 51 which drives the gear sector 68 of the valve 6 through the rack 52 on the connecting rod.

Fluid under pressure from an outside source enters the meter through the port 33 into the bottom casting 3, which mounts against the bottom face of the main casting 1. The screen 32 is held in place by the rim 34 and by the lower face of the gasket 31. Entering fluid passes upward through the screen and to the passage 14, which leads to the regulator valve seat 40 and its soft seating ring 400, against which a ball valve element 41 operates under the control of the regulator arm 42. This arm is carried by the fulcrum pin 43 in the sleeve 44, which is secured against the wall of the regulator chamber 140 by the mounting screw 47. This lower screw 47 also serves to secure the valve base 62. The upper mounting screw 470 serves to complete the mounting of the valve base 62 and also acts as a travel-limiting stop for the arm 42.

The regulator arm is urged in a closing direction by the diaphragm 410, which is mounted between the rear face of the casting 1 and the retainer casting 401, and in an opening direction by the spring 411. The diaphragm is clamped between the plates 43 by the sleeve 46 and screw 49. The pin 45 pivotally connects the sleeve 46 and the arm 42. The regulator retainer casting 401 is vented conventionally through the port 402 to atmosphere; or it may be conventionally connected to any other desired reference pressure. When its function becomes that of a simple cap, as in the case when no regulator diaphragm or working parts are used, the vent is omitted.

Figure 3 shows the trip valve structure. The valve base plate 62, which mounts into the meter body as already shown, carries the pressed-in posts 661 and 662, on which the rest of the valve assembly is carried. Valving is accomplished by the lateral rocking of the valve plate 63, which is urged against the face of the valve base 62 by the calibrated springs 611. Both of the valve mating surfaces are lapped. The transfer space 630 in the plate 63 registers with the central port 621, which is the supply port from the regulator chamber 140 through the passage 121, and with one of the cylinder end ports 622, the remaining cylinder port being at the same time open to the central chamber 10. The valve plate 63 follows the position of the dependent escapement arm 65 through the driving action of the pins 651 and 652, which engage freely the holes 631 and 632 in the valve plate 63.

The arm 65 is brazed to the sleeve 655 which is carried freely on the post 661. Urged against the sleeve 655 by the strong C-spring 69 are the loading clips 691. During the operating cycle of the valve the post 641 on the primary escapement arm 64 moves in a generally lateral direction, separating the clips 691 and causing the dependent arm 65 to be urged in a following direction by pressure of the lagging clip on the dependent arm post 650. Escapement pins 654a and 654b are positioned to engage the sectors 642a and 642b, respectively, on the primary arm 64. During the loading period, as already indicated, one of these pins engages the outer edge of its mating sector, preventing the dependent arm 65 from following the urging of the loading spring 69. Figure 4 shows pin 654a at the limit "b" of its peripheral engagement with sector 642a, ready for release. Upon release, the dependent arm 65 abruptly carries the valve plate 63 to its opposite position. As reverse motion of the primary arm 64 begins, the pin 654b passes the corner "e" of sector 642b, causing its restraint by this sector thereafter until the release point "b" of this sector is reached. Normally the passing faces "c" and "d" do not touch the escapement pins, being cleared away from the points of release. Their function is to prevent there being any locked or dead possible position of the valve. Before the releasing escapement pin clears its opposed face "c," the opposite pin reaches its opposed face "d."

The primary escapement arm 64, which carries the post 641 and sectors 642a and 642b, is itself carried on the post 662. Upon the necked-down portion 644 of the integral sleeve 643 of the primary arm 64 is carried the gear sector 68, which engages the rack 52, a part of the piston rod assembly and secured to the rod 51. The rack 52 is held in mesh or engagement with the gear sector 68 by the back-up roller 67, which is carried upon the sleeve 655. The sleeve 667 and washers 666 complete the spacing of the parts riding upon the sleeve 655, and the clip-washer 668 completes the retention of the whole assembly upon the post 661, as does the clip-washer 669 for the assembly upon the post 662. The rack 52 rides freely, with some allowance for play, between the gear sector 68 and the roller 67. Because the longitudinal portion of the piston rod 51 and its carried parts are substantially apart from the cylinder axis, the weight of these parts urges the piston and rod assembly to turn within the cylinders 11 until supported by the back-up roller 67. The looseness in mesh between the rack 52 and the gear sector 68 remains constant because of the continued bearing of the assembly upon the roller 67, and therefore does not affect the constancy of calibration of the meter. Another advantage of this construction is realized whenever the valve assembly as a whole is installed out of alignment with the axis of the cylinders 11, when the freedom of the piston and rod assembly to turn in the cylinder bores permits this assembly to find its proper running position between the roller 67 and gear sector 68. The dimensional looseness normally provided in the valve assembly between the gear sector and the back-up position of the roller is enough to allow a considerable degree of angularity, such as would be present when the piston and rod assembly is required to compensate for substantial misalignment, without binding.

Actual calibration of the meter is provided by adjustment of lost motion or play between the gear sector 68 and the primary escapement arm 64. Carried on the primary arm are the posts 645. These abut against the screws 681 in the gear sector 68, which are locked by the nuts 682. Rough calibration of the meter is provided before assembly of the valve into the meter body by preliminary adjustment of screws 681. After installation of the valve and piston and rod assemblies, but before final closing of the front of the central chamber 10, final calibration may be done by actual measurement of flow through the meter and comparison with a standard. Final adjustment of one or both of the screws 681 is accomplished through the open front of the central chamber 10.

A cycle of operation may now be briefly described. Starting with the parts in the relative positions shown in Figure 1, the meter is ready to begin a half-cycle of piston movement in a rightward direction. The valve 63 registers between the incoming fluid port 621 and the left cylinder port 622, which connects with the outer end of the left cylinder through its passage 13. Flow through this circuit drives the piston and rod assembly to the right, while fluid from the right cylinder passes back through the right passage 13 and the right cylinder part 622 into the central chamber 10. Outgoing fluid from the chamber 10 leaves through the exit port 101 in the upper part of the chamber. At the end of the rightward piston stroke the valve 6 trips, reversing the port registry and initiating the return half-cycle.

As previously indicated in the statement of objects of this invention, the valve plate 630 is held against its seat by springs 611, the holding force of which is calibrated before installation to limit the pressure under the valve seat as compared to that in the chamber 10 to a predetermined difference. Friction of the pistons against the cylinder bores, valve and read-out loadings, and fluid friction in flowing through passages, require for continued normal functioning of the metering parts a pressure differential between the supply port 621 and the delivery from the central chamber 10. In critical applications, such as in lubrication systems, it is necessary that delivery continue whether the meter records all delivered flow or not. Should the central valve for any reason fail to throw properly or jam, it is necessary in such cases that delivery nevertheless continue. In our meter this is assured by lifting of the valve plate from its seat, allowing by-passing of the normal path, whenever the pressure drop exceeds calibrated value. For continued delivery it is only necessary that the net available fluid pressure be enough to lift the valve plate. Aside from cases of malfunction, there is another case in which this action may occur; momentary demand exceeding the capacity of the meter functioning normally. The most likely case of this kind occurs in cold-weather operation with highly viscous fluids the resistance to flow of which through the passages of the meter may become excessive. In such extreme cases continued supply of fluid is assured, so long as the rest of the supply system remains able to deliver. It should be clearly emphasized, however, that it is not normally contemplated that the by-passing function will be needed; it is there solely as a protection and insurance that the meter will continue to deliver fluid when needed.

For applications in which metering of all fluid passing must be insured, we may optionally calibrate the pressure regulator 4 to a pressure too small to cause by-passing of the valve 6. This is done by suitable choice of the spring 411. Reference pressure at the back of the diaphragm 410 in the retainer cap 401 may be atmospheric by simple venting as shown at 402; or any suitable reference pressure may be carried to this point in the usual or conventional manner.

Our preferred piston and rod construction will now be described. For mechanical location with respect to the cylinder bores of the piston and rod assembly, we preferably employ simple plate pistons 50 carried on studs 55 on the ends of the connecting rod 51. These pistons fit their cylinder bores with only enough mechanical clearance to prevent binding. Against the pistons 50 the piston sealing cups 57 are held by the retaining plates 58, which are in turn secured by the retaining nuts 59. The piston cups 57 are formed from fluorocarbon sheet stock by drawing at suitable forming temperature and cooling, to an outer cup diameter slightly larger than that of the cylinder bores 11. The normal tendency of this material to creep back toward its initial flat condition insures continued pressure of the outside of these cups against the bores. In order to avoid scoring of the bores by particles of abrasive material which might embed themselves in the relatively soft cup material, we have found it desirable to provide a bore with a finished surface of high hardness. In a preferred construction, the body is an aluminum alloy casting and the bores are electrolytically hardened by oxide formation, after which they are finely honed for finish. We have found the resultant quality of sealing excellent and the resistance to sealing deterioration because of wear very acceptable.

Referring again to Figures 1 and 2, registry of the action of the meter is done by counting piston stroke cycles through the non-magnetic barrier 71, which is in the form of a cup the flange of which is conventionally secured against the front face of the body casting 1, using the gasket 701. The numeral 7 refers generally to the magnetic drive and counter assembly, which is covered by the outer casting 72, sealed against the front face of the cup barrier 71 by gasket 712, and having the front window 74 and slotted dial plate 741, held in place by the snap ring 742. The drum type counter 75 is of conventional external-pinion type, and is carried on the counter frame 73, held in place by mounting studs and spacing nuts 711. The first wheel of the counter is driven by the ratchet wheel 751, and backed up by the spring brake 733, anchored on the pinion shaft 752, which permits forward motion of the wheel more readily than return motion. As shown the counter is top going. The pawl arm 77 operates the ratchet wheel 751 through the tip 778, and is pivoted around the fulcrum pin 772, carried on the frame 73. The fulcrum end of the pawl arm is bent into two tabs 771, which bear against the pin 772, permitting endwise motion of the pawl arm. The driving element for the pawl arm is the yoke 76, carried on pivots 763 and having a lateral portion 764 to which the transfer pin 765 is secured. This pin passes through a freely fitting hole in the pawl arm, and, in the reverse direction, into the enlarged hole 766 in the frame 73, the wall of which determines the limits of travel of the pin 765. The spring 767 urges the pawl arm against the ratchet wheel 751. Movement of the yoke 76 in a rocking path around its pivots 763 causes the pin 765 to move the pawl arm in a direction to actuate the ratchet wheel one tooth at a time, and return. Thus, one cycle of movement of the yoke causes the counter ratchet to be advanced by one tooth, with registry occurring on the throw of the yoke in one direction only.

It will be seen that, by means of this mechanism, we are enabled simply to actuate the counter, which is horizontal-reading, by means of a swinging-yoke drive which moves in a generally lateral rocking path. This movement is in response to that of the piston rod 51, by means of the magnetic drive to be described.

Carried on the central portion of the piston rod 51 are two ceramic permanent magnets 53 and 54. These are side by side and magnetised through their thicknesses. Magnet 53 is placed with its N pole out, while 54 has its N pole in. A common field passes between these magnets, being carried by the relatively permeable steel piston rod on one side, and through non-magnetic media including the barrier 71 on the other. Similarly, the yoke 76 carries a magnetic backing plate 760, to which two more similar ceramic magnets are secured. Of these, 761 has its N pole facing that of 53 (when these are in opposition), while 762 has its N pole against its backing plate 760. It will be evident that the external portions of the fields of these two magnet assemblies are in opposition, so that, when these assemblies are physically opposed, they repel each other. When they are laterally displaced, the continuing force of repulsion has a lateral component. In the end positions as shown in Figure 1, there is some attraction between the magnets then in opposition. A cycle of action proceeds as follows: Starting in the positions shown, the driven or yoke magnet assembly is urged rightward against its limit. As the driving magnetic assembly on the piston rod proceeds rightward, it passes the position of opposition to the driven assembly, causing a reversal of the lateral component of force. The driven assembly then swings abruptly to the left, gaining force as it proceeds and indexing the counter ratchet. On the return stroke of the piston rod, the driven assembly is returned by reversal of the lateral component of the repelling force. The action described is the magnetic equivalent, substantially, of a mechanical toggle. It is predictably repeatable from cycle to cycle, and proceeds with a powerful snap, capable of overcoming a large amount of friction in the counter, even when the whole counter turns over.

It will now be evident that the lateral component of force against the driven magnetic assembly, which is equivalent to the longitudinal component against the driving assembly, diminishes as the stroke of the piston proceeds, reducing progressively and finally reversing the opposition of the magnetic assembly to the motion of the piston and rod assembly. This reversal of the initially opposing force partially compensated for any build-up of force opposing the piston travel by the valve loading means. The over-all effect of the reversal in the magnetic loading of the piston assembly is the reduction in the fluid pressure otherwise required to complete the piston stroke to the point of reversal. This not only gives a greater margin in the force available to complete each stroke, with accompanying improvement in reliability of operation, but also reduces the amount of decompression of air or other gas which may be present in the cylinder end at the end of the piston stroke, thereby reducing the calibration error from this cause.

The magnetic drive as generally shown is not limited in utility to the operation of a mechanical counter assembly. Any other type of registry device which falls within the force limitations of the magnetic drive could be employed as well. Thus, the magnetic drive could alternatively power conventional electrical position or impulse switches, analog or digital transmitters, or even pneumatic or hydraulic transmitting means, to equal advantage.

We claim:

1. In a fluid flow meter having positive displacement reversing flow measuring means, a cycling valve therefor including a valve base having a ported valve face, a valve plate adapted to bear against valve face and to determine by its position thereon the registry of the porting thereof, a rockably mounted dependent escapement arm adapted to transfer its motion to said valve plate, a primary escapement arm rockably mounted around a center substantially apart from that of said dependent arm, means for rockably actuating said primary arm in response to the motion of said flow measuring means, loading means adapted to urge said dependent arm in a direction to reverse the position of said valve in response to the motion of said flow measuring means, and cooperating means associated with said primary and dependent arms for first preventing said dependent arm from following the urging of said loading means but subsequently releasing said dependent arm to move in a valve-reversing direction.

2. The fluid flow meter having positive displacement reversing flow measuring means, a cycling valve therefor including a valve base having a ported valve face, a valve plate adapted to bear against said valve face and to determine by its position thereon the registry of the porting thereof, two carrying posts rigidly secured to said base and placed substantially apart and perpendicular to the valve face thereof, a dependent escapement arm rockably mounted upon one of said posts and adapted to transfer its motion to said valve plate, a primary escapement arm rockably mounted upon the other of said posts, means for rockably actuating said primary arm in response to the motion of said flow measuring means, loading means responsive to the motion of said flow measuring means and adapted to urge said dependent arm in a direction to reverse the position of said valve, and cooperating means associated with said primary and dependent arms for first preventing said dependent arm from following the urging of said loading means but subsequently releasing said dependent arm to move in a valve-reversing direction.

3. In a fluid flow meter having positive displacement reversing flow measuring means, fluid admission and exit means and a central chamber adapted to deliver to said exit means, a cycling valve in said chamber adapted to be operated by said flow measuring means and including a valve seat, a valve plate adapted to slide thereon, calibrated loading means adapted to urge said valve plate against said seat, and porting means for carrying fluid from said admission means to said valve seat under said valve plate, whereby said valve plate may be lifted against said loading means from said valve seat to permit flow of fluid from said porting means directly into said central chamber and thence to said exit means whenever the difference in fluid pressure between said porting means and said chamber exceeds a predetermined amount.

4. In a fluid flow meter having admission and exit means, a central chamber adapted to deliver to said exit means, and positive displacement alternately operative fluid displacement means oppositely disposed from said chamber, a cycling valve in said chamber having a valve seat and a slidable valve plate adapted to be reversibly operated against said seat by said displacement means, said seat having a central port adapted to receive incoming fluid from said admission means and separate ports leading to said displacement means placed on either side of said central port and adapted to be connected therewith alternately according to the position of said valve plate, the remaining port being simultaneously connected to deliver into said central chamber.

5. In a fluid flow meter of the class which employs positive displacement metering means and a cycling valve therefor, cycling valve construction comprising a ported valve base, a pair of laterally separated posts carried thereby, primary and dependent escapement members operably carried by said posts, a valve driving rack operably associated with said displacement means, a gear sector adapted to be driven by said rack, and driving means between said rack and said primary escapement means adapted to permit adjustably a degree of lost motion or play between said rack and said primary escapement means.

6. In a fluid flow meter having cyclically moving flow measuring means, a primary magnetized element adapted to be moved thereby and having an external magnetic field, a barrier of non-magnetic material adjacent to said primary element and oriented to permit motion of said element generally along the face of said barrier, and a secondary separately magnetized element on the opposite side of said barrier and mounted to permit limited reversible motion thereof in a direction generally parallel to that of said primary element, said primary and secondary elements having external magnetic fields in magnetic opposition or mutually repulsive relationship when said elements are in geometrically opposite positions.

7. In a fluid flow meter having opposed pistons joined by a common connecting rod, means for registering the cyclic motion of said rod comprising a primary magnetized element adapted to be carried by said rod, a non-magnetic barrier adjacent thereto and having a face generally oriented to permit motion of said primary element along said face, and a secondary separately magnetized element on the opposite side of said barrier, mounted to permit limited motion of said secondary element along the opposite face of said barrier, said primary and secondary elements having external magnetic fields in magnetic opposition or mutually repulsive relationship when said elements are in geometrically opposite positions.

References Cited in the file of this patent

UNITED STATES PATENTS

| | | |
|---|---|---|
| 474,241 | Goodman | May 3, 1892 |
| 1,666,107 | Phillips | Apr. 17, 1928 |
| 1,675,337 | Folberth et al. | July 3, 1928 |
| 1,999,362 | Jauch et al. | Apr. 30, 1935 |
| 2,255,219 | Hutchinson et al. | Sept. 9, 1941 |
| 2,678,029 | Sprague et al. | May 11, 1954 |
| 2,860,513 | Cheronnet | Nov. 18, 1958 |